Sept. 9, 1930.  A. G. JOHNSON  1,775,282
RENEWABLE RUBBER BEARING

Filed Dec. 26, 1929

Inventor
A. G. Johnson

By Emil F. Lange
Attorney

Patented Sept. 9, 1930

1,775,282

UNITED STATES PATENT OFFICE

ANDREW G. JOHNSON, OF LINCOLN, NEBRASKA

RENEWABLE RUBBER BEARING

Application filed December 26, 1929. Serial No. 416,426.

My invention relates to bearings and more particularly to bearings which are designed specifically for use in driving rotary pumps and the like.

The primary object of my invention is the provision of a bearing for the pump shaft of a rotary pump for pumping water.

Another of my objects is the provision of a rubber bearing for withstanding the abrasive action of sand in the water of the well.

Another object is the provision of a cage for the bearing rubber, the cage being so designed that the bearing rubber may be renewed and replaced whenever this becomes necessary or desirable.

Another of my objects is the provision of a cage with its bearing rubber so designed as to provide a helical channel for the passage of water on which the lubrication of the bearing depends.

Having in view these objects and others which will be pointed out in the following description, I will now refer to the drawings, in which Figure 1 is a vertical sectional view of the entire bearing.

Figure 2:
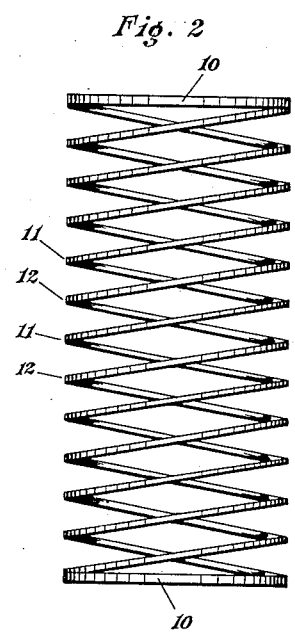
Figure 2 is a view in elevation of the bearing cage.

The cage includes two annuli 10 which are spaced apart a suitable distance and which are connected together by means of two helical spirals 11 and 12, the ends of which are secured to an annulus 10 at diametrically opposite points as shown in Figure 2. This cage may be made from any suitable material, the preferred material at present being brass or bronze. The material, however, may be varied to meet local conditions or to take advantage of any developments or discoveries that may be made in the art. It is necessary, however, that the material be sufficiently rigid for the purpose and that it be relatively resistant against the action of the water or of the salts dissolved in the water. Since the cage does not present any wearing surface to the shaft, it is not necessary to select a material having great wearing qualities under friction. The material in most cases will be one of the metals or an alloy of various metals but it may be hard rubber or bakelite or any other suitable material.

Figure 1:
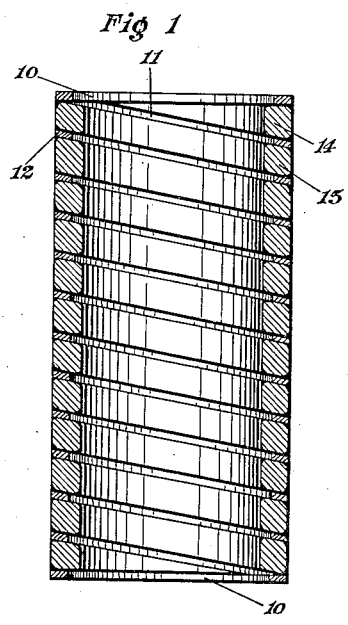
Figure 3:
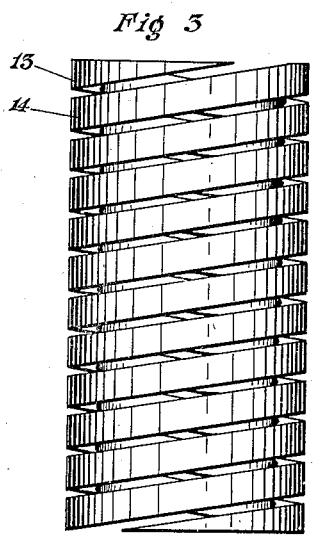
Figure 3 is a view in elevation of the bearing rubber.
Figure 4:
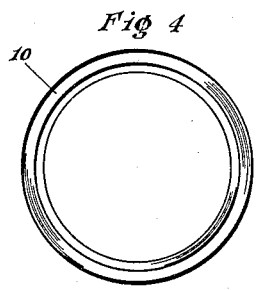
Figure 4 is an end view of the bearing.

The cage shown in Figure 2 is adapted for use over indefinite periods of time since it is not subjected to wear and since it is not subject to deterioration from chemical action if the material has been properly selected. The cage is designed merely as a support for the bearing proper. This bearing, as shown in Figure 3, consists of two helical bands 13 and 14 of soft rubber and of sufficient thickness to project into the interior of the cage as shown in Figure 1. In applying the rubber bands to the cage, the ends of the bands are first trimmed into the form of an acute angle and they are inserted between an annulus 10 and the end portion of one of the spirals 11 and 12. The whole device is placed on a mandrel and the rubber bands are wound between the spirals to occupy the position shown in Figure 1. At the end of the winding operation the bands are trimmed so as to provide ends which fit snugly between the annulus 10 and the end of the spirals 11 and 12. The ends of the rubber bands may be sealed in position but they are normally held in fixed position during the operation of the bearing.

The shaft which is supported in the bearing has its bearing entirely against rubber surfaces. These rubber surfaces are in helical form leaving two narrow spaces or helical grooves corresponding to the members 11 and 12 of the cage. Since the bottom of the bearing is in contact with the water or in close proximity to the water of the well, the tendency is for the water to creep upward in the helical grooves to lubricate the entire bearing surface of the rubber bands. This is desirable since water constitutes the best lubricant for use in a rubber bearing and since water constitutes the most satisfactory lubricant for use in pumping water. The drawings show a bearing for a right-hand shaft and the friction of the rapidly rotating shaft tends to carry the water upwardly in the helical grooves. It is obvious, however, that the cage and bearing rubber could be correspondingly altered for use with a left-hand shaft.

From the foregoing description it will be obvious that I have provided a bearing having marked advantages over prior bearings especially in pumping water for household use. The bearing is water lubricated and the lubrication is entirely automatic. In pumping water from wells for household use it is undesirable that any of the ordinary lubricants be used as they are apt to impart a disagreeable taste to the water. This objection is avoided by the use of water as a lubricant. Water wells contain more or less sand of all degrees of fineness and the fine particles of sand are very often suspended in the flowing water. Ordinary metal bearings are apt to be cut out by the sand regardless of the hardness of the metal. Rubber on the other hand is yielding and it allows the fine particles of sand to work gradually through the bearings without injury to them.

Having thus described my invention in such full, clear and exact terms that its construction and operation will be readily understood by others skilled in the art to which it pertains, what I claim as new and desire to secure by Letters Patent of the United States is:

1. A bearing for a rotating shaft, said bearing comprising a rubber band arranged in helical form with the windings spaced apart to provide a helical channel for the passage of lubricant.

2. A bearing for a rotating shaft, said bearing comprising a rubber band arranged in helical form with the windings spaced apart to provide a helical channel for the passage of lubricant, the horizontal direction of the upward windings of said rubber band corresponding with the direction of rotation of the shaft.

3. A bearing for a rotating shaft, said bearing including a relatively rigid support in helical form and a rubber band between the windings of said support, said band projecting beyond the inner surface of said support to function as a bearing for the rotating shaft.

In testimony whereof I affix my signature.

ANDREW G. JOHNSON.